United States Patent
Dasarathan et al.

(10) Patent No.: US 9,721,129 B1
(45) Date of Patent: Aug. 1, 2017

(54) METHODS AND SYSTEMS FOR SMART HANDLING OF WAREHOUSE ITEMS

(71) Applicant: SYMBOL TECHNOLOGIES, LLC, Lincolnshire, IL (US)

(72) Inventors: Mohan Dasarathan, Tamil Nadu (IN); Rajeev Varma, Bangalore (IN); Kavya Babu, Bangalore (IN); Bijosh Thykkoottathil, Calicut (IN)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/008,627

(22) Filed: Jan. 28, 2016

(51) Int. Cl.
| | | |
|---|---|---|
| *G06F 17/00* | (2006.01) | |
| *G06K 7/10* | (2006.01) | |
| *G06K 19/06* | (2006.01) | |
| *H04W 4/04* | (2009.01) | |
| *G08B 21/18* | (2006.01) | |
| *G01L 5/22* | (2006.01) | |

(52) U.S. Cl.
CPC .......... *G06K 7/10396* (2013.01); *G01L 5/228* (2013.01); *G06K 7/10297* (2013.01); *G06K 7/10475* (2013.01); *G06K 19/06028* (2013.01); *G08B 21/182* (2013.01); *H04W 4/043* (2013.01)

(58) Field of Classification Search
CPC .......... G06F 3/014; G06F 3/011; G06F 3/016; G06F 3/013; G06F 3/017; G06F 3/0304; G06F 3/0482; G06F 1/163; G06F 3/012; G06F 3/0484
USPC .................................................. 235/375, 492
See application file for complete search history.

(56) References Cited

U.S. PATENT DOCUMENTS

| | | | | |
|---|---|---|---|---|
| 2007/0288104 | A1* | 12/2007 | Yamauchi | G06F 3/014 700/52 |
| 2012/0143640 | A1* | 6/2012 | Victorio | G06Q 10/063 705/7.11 |
| 2012/0144554 | A1* | 6/2012 | Thellmann | A63B 21/4033 2/161.1 |
| 2014/0358263 | A1* | 12/2014 | Irmler | G06F 3/014 700/94 |
| 2015/0016777 | A1* | 1/2015 | Abovitz | G02B 27/225 385/37 |
| 2015/0130698 | A1* | 5/2015 | Burgess | G06F 1/163 345/156 |
| 2016/0132110 | A1* | 5/2016 | Mutz | B07C 7/005 340/870.07 |

OTHER PUBLICATIONS

Wessel, Rhea, "Fitness and RFID Go Hand in Glove," RFID Journal, dated Jul. 31, 2009, retrieved from the Internet on Nov. 8, 2016 from <http://www.rfidjournal.com/articles/view?5090>.

\* cited by examiner

*Primary Examiner* — Thien M Le

(57) ABSTRACT

Methods and systems for smart handling of warehouse items. An embodiment takes the form of a wearable accessory that is configured to (a) identify an object, (b) detect an attachment-triggering event, (c) responsive to detecting the attachment-triggering event, attach to the object, (d) determine at least one handling constraint associated with the object, where the at least one handling constraint includes an acceptable pressure range, (e) measure a pressure exerted on the object via the accessory, (f) provide an indication, via a user interface, based on the measured pressure and the acceptable pressure range; and (g) detect a release-triggering event, and responsively release the object.

23 Claims, 5 Drawing Sheets

METHODS AND SYSTEMS FOR SMART HANDLING OF WAREHOUSE ITEMS

BACKGROUND OF THE INVENTION

Proper handling of warehouse items involves diverse operations that are vital to industry. These operations include, amongst other things, identifying items, manually carrying items to predetermined locations, and storing items at those respective locations. These operations (and others) provide for a continuous flow of items through the warehouse and ensure that items are available when needed. Improper handling of warehouse items, on the other hand, can negatively impact the continuous flow of items through the warehouse and may result in increased costs.

There are many factors that contribute to the improper handling of warehouse items. One factor is user notification of the item's physical nature. There is no process in place to indicate to a user that an item should be handled safely based on the physical nature of that item. The item may be brittle, fragile, or contain a liquid substance, among numerous other possibilities. While the physical nature of an item can be alerted with a warning sign, such warning signs can sometimes be overlooked by the user.

Accordingly, there is a need for methods and systems for smart handling of warehouse items.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
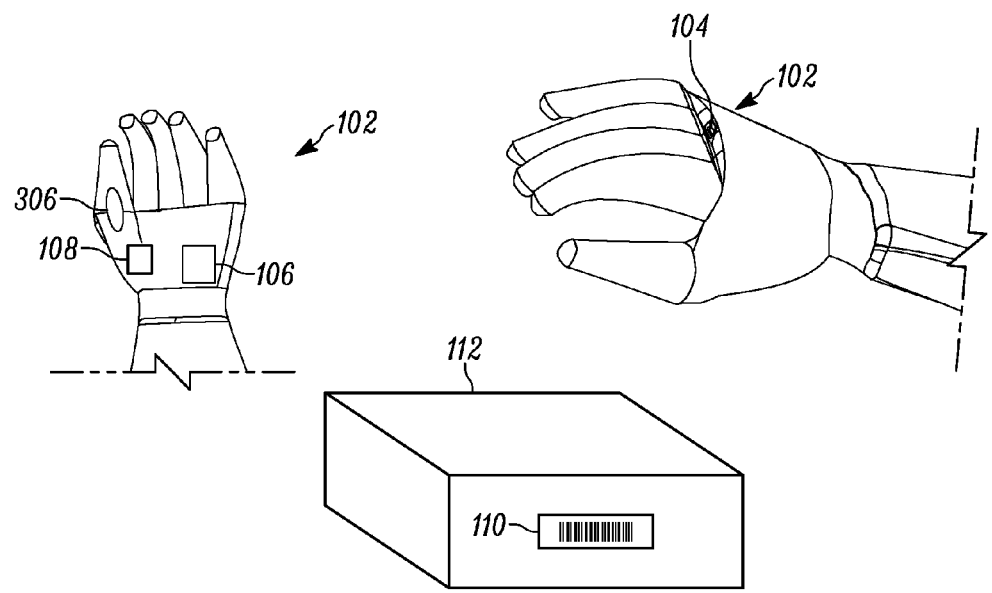
FIG. 1 depicts several views of a first example pressure-sensing glove, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment takes the form of a wearable accessory that is configured to (a) identify an object, (b) detect an attachment-triggering event, (c) responsive to detecting the attachment-triggering event, attach to the object, (d) determine at least one handling constraint associated with the object, where the at least one handling constraint includes an acceptable pressure range, (e) measure a pressure exerted on the object via the accessory, (f) provide an indication, via a user interface, based on the measured pressure and the acceptable pressure range; and (g) detect a release-triggering event, and responsively release the object.

Another embodiment takes the form of a method that includes carrying out at least the functions described in the preceding paragraph.

In at least one embodiment, identifying the object includes scanning a barcode associated with the object.

In at least one embodiment, identifying the object includes scanning an RFID tag associated with the object.

In at least one embodiment, attaching to the object includes applying a suction pressure to the object.

In at least one embodiment, the indication includes a high-pressure indication if the measured pressure exceeds the acceptable pressure range.

In at least one embodiment, the indication includes a low-pressure indication if the measure pressure is below the acceptable pressure range.

In at least one embodiment, the wearable accessory further includes a user-interface element, and the wearable accessory is configured upon actuation of the user-interface element to responsively (a) determine whether or not an object is currently identified and, if so, determine whether or not the accessory is attached to the currently identified object, (b) initiate an object-scan function if no object is currently identified, (c) initiate an object-attach function if an object is currently identified and the accessory is not currently attached to the currently identified object, and (d) initiate an object-detach function if an object is currently identified and the accessory is currently attached to the currently identified object. In at least one such embodiment, the user-interface element is a button.

In at least one embodiment, determining the at least one handling constraint associated with the object includes (a) sending, to a remote server, an identity of the object, and (b) receiving, from the remote server, at least one handling constraint associated with the object.

In at least one embodiment, the release-triggering event is actuation of a user interface element. In at least one such embodiment, the user-interface element is a button.

In at least one embodiment, the release-triggering event includes a proximity to a destination location. In at least one such embodiment, the proximity is the proximity of the object. In at least one other such embodiment, the proximity is the proximity of the wearable accessory.

In at least one embodiment, detecting the release-triggering event includes detecting the release-triggering event via a proximity sensor of the wearable accessory.

In at least one embodiment, detecting the release-triggering event includes receiving a proximity indication from a proximity sensor remote to the wearable accessory.

Another embodiment takes the form of a system that includes a wearable accessory that includes an attachment mechanism configured to attach to an object; a pressure-sensor system configured to measure a pressure exerted on the object; a communication interface; a user interface; and a controller programmed to carry out a set of functions, which includes receiving, via the communication interface, at least one handling constraint associated with the object, where the at least one handling constraint includes an acceptable pressure range; detecting an attachment-triggering event, and responsively controlling the attachment mechanism to attach to the object; providing an indication, via the user interface, based on the measured pressure and the acceptable pressure range; and detecting a release-triggering event, and responsively controlling the attachment mechanism to detach from the object.

In at least one embodiment, the wearable accessory is a first wearable accessory that is configured to be worn on a first hand of the user. In at least one such embodiment, the system further includes a second wearable accessory that is configured to be worn on a second hand of the user. In at least one such embodiment, the pressure-sensor system includes a first pressure-sensor system disposed on the first wearable accessory and a second pressure-sensor system disposed on the second wearable accessory, and the measuring pressure exerted on the object includes (a) receiving a first and a second measured pressure from the first and second pressure-sensors systems, respectively, and (b) determining the pressure exerted on the object based on the first and second measured pressures.

In at least one embodiment, the wearable accessory further includes a ring scanner configured to (a) scan an object identifier associated with the object and (b) send, to the communication interface, a representation of the scanned object identifier, where the at least one received handling constraint is associated with the representation of the scanned object identifier.

Moreover, any of the variations and permutations described herein can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseam in this detailed description.

FIG. 1 depicts several views of a first example pressure-sensing glove, in accordance with some embodiments. In particular, FIG. 1 depicts an example pressure-sensing glove 102 and an object 112 (e.g., a box or other package). The pressure-sensing glove 102 has a scanner 104, an RFID reader 106, and an NFC reader 108. The object 112 has an indicia 110 (e.g., a bar code).

The scanner 104 can be affixed to any portion of the pressure-sensing glove 102. The scanner 104 can also be peripheral to the pressure-sensing glove.

The RFID reader 106 can be affixed to any portion of the pressure-sensing glove 102. The RFID reader 106 can also be peripheral to the pressure-sensing glove.

The NFC reader 108 can be affixed to any portion of the pressure-sensing glove 102. The NFC reader 108 can also be peripheral to the pressure-sensing glove.

Figure 2:
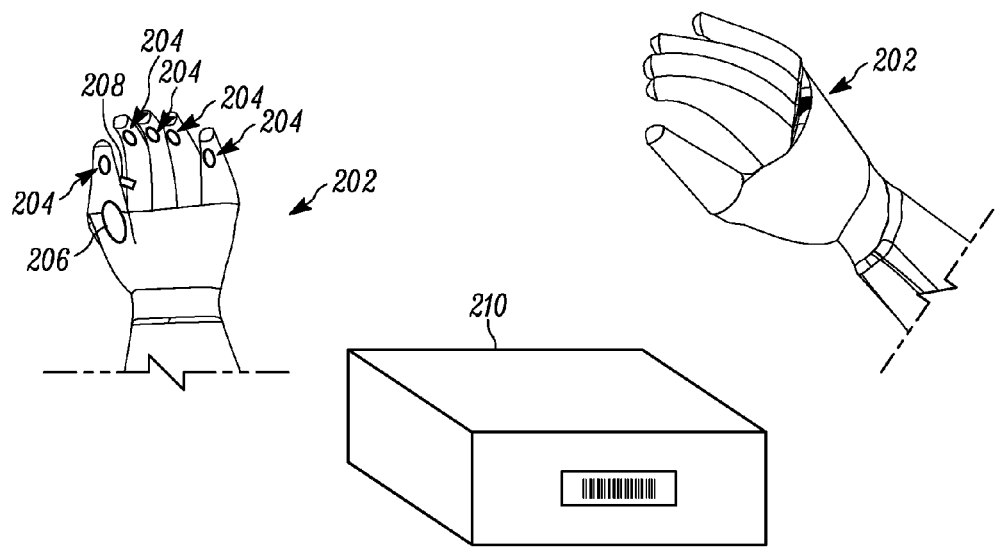
FIG. 2 depicts several views of a second example pressure-sensing glove, in accordance with some embodiments.

FIG. 2 depicts several views of a second example pressure-sensing glove, in accordance with some embodiments. In particular, FIG. 2 depicts a pressure-sensing glove 202 and an object 210. The pressure-sensing glove 202 includes a suction and gripping apparatus 204, a proximity sensor 206, and a user-interface button 208. It is noted that the locations of these components that are displayed in the example of FIG. 2 are by way of example, and that other configurations could be used.

The suction and gripping apparatus 204 applies suction pressure to the object 210, perhaps in response to receiving a signal from the proximity sensor 206, perhaps in response to receiving a signal denoting actuation of the user-interface button 208, perhaps in response to a voice command, among numerous other possibilities that could be listed here.

The proximity sensor 206 may be configured to work in a number of different ways, perhaps using infrared, sonar, detection of a nearby RFID tag, RF communication, and/or one or more other types of proximity-detecting technologies. The proximity sensor 206 may be further configured to transmit a corresponding signal to a processor, controller, or the like of the pressure-sensing glove 202 responsive to detection of proximity of one or more items.

The user-interface button 208 may be manually operable to apply suction pressure on the object 210, and may also be manually operable to release suction pressure from the object 210. The user-interface button 208 could have any of a number of other functions as well. In an embodiment, the result of actuating the user-interface button 208 may change depending on the current state of the pressure-sensing glove 202. For example, if no current object (e.g., the object 210) has yet been identified, then actuation of the user-interface button 208 may cause the pressure-sensing glove 202 to activate its scanner and perform a scanning function to identify an object. If, however, an object has been identified but the pressure-sensing glove 202 has not yet attached to that currently identified object, then actuation of the user-interface button 208 may cause an attachment action, such as by way of the suction and gripping apparatus 204. If an object has been identified and the pressure-sensing glove 202 has attached to the currently identified object, then actuation of the user-interface button 208 may cause a release or detachment action. And certainly other possible implementations could be listed here as well.

Figure 3:
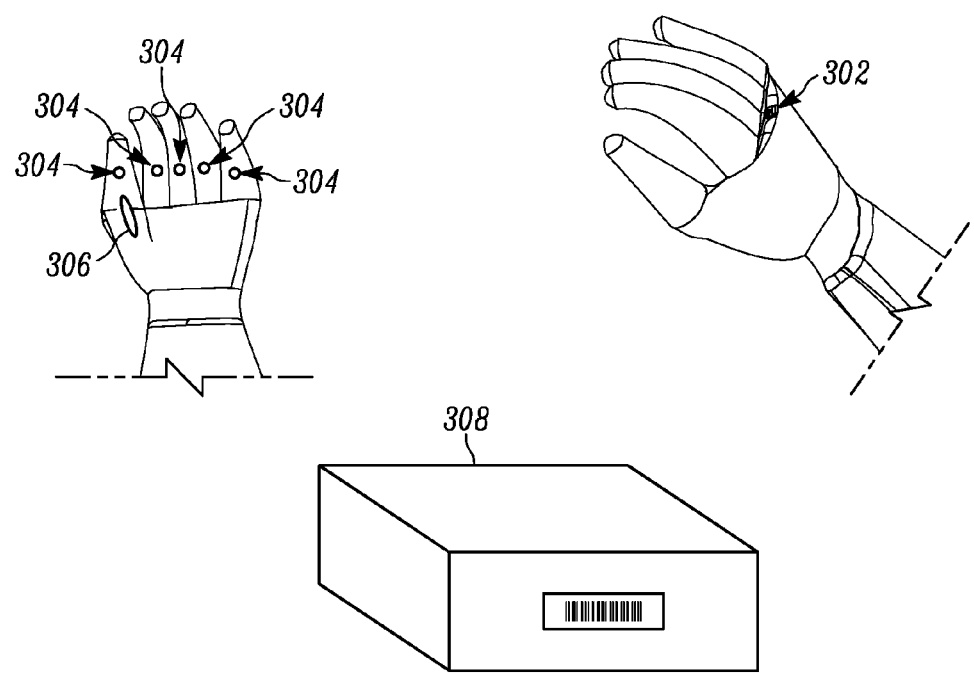
FIG. 3 depicts several views of a third example pressure-sensing glove, in accordance with some embodiments.

FIG. 3 depicts several views of a third example pressure-sensing glove, in accordance with some embodiments. In particular, FIG. 3 depicts a pressure-sensing glove 302 and an object 308. The pressure-sensing glove 302 includes pressure sensors 304 and a user-interface-notification element 306. It is noted that the locations of these components that are displayed in the example of FIG. 3 are by way of example, and that other configurations could be used.

The pressure sensors 304 may be configured to work in a number of different ways, perhaps using capacitive, inductive, strain gauge, and/or one or more other types of pressure-sensing technologies. The pressure sensors 304 may be further configured to transmit a corresponding signal to a processor, controller, or the like of the pressure-sensing glove 302.

The user-interface-notification element 306 provides a notification to the user, perhaps in an illuminated form, perhaps in an audible form, perhaps in a tactile form, among numerous other possibilities that could be listed here. The user-interface-notification element 306 may be triggered in a number of different ways. For example, if the pressure exerted on a current object (e.g., the object 308) is above a pre-determined range (or upper threshold), the user-interface-notification element 306 may notify the user of the high pressure exerted on the object 308. If, however, the pressure exerted on the object 308 is below the pre-determined range (or lower threshold), the user-interface-notification element 306 may notify the user of the low pressure exerted on the object 308. And certainly, other possible implementations can be listed here as well.

Figure 4:
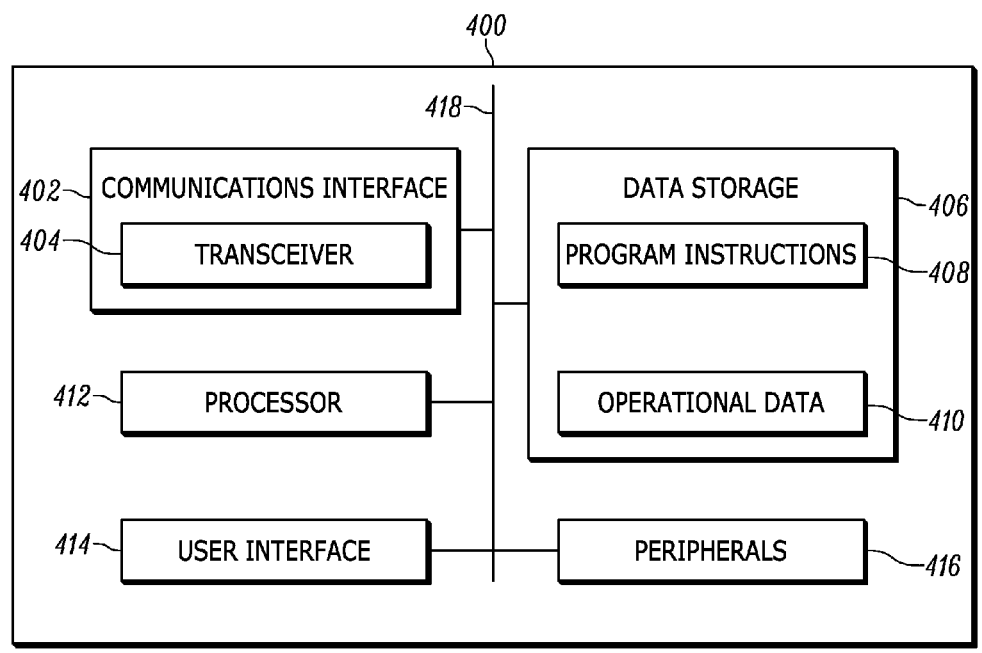
FIG. 4 depicts an architectural view of an example pressure-sensing glove, in accordance with some embodiments.

FIG. 4 depicts an architectural view of an example pressure-sensing glove, in accordance with some embodiments. The example pressure-sensing glove 400 includes a communications interface 402 (that includes a transceiver 404), data storage 406 (that contains program instructions 408 and operational data 410), a processor 412, a user interface 414, peripherals 416, and a communication bus 418. This arrangement is presented by way of example and not limitation, as other example arrangements could be described here.

As stated above, the communication interface 402 includes the transceiver 404. The transceiver 404 may be configured (e.g., tuned) to receive and transmit on one of a set of channels. The transceiver 404 may be a single component, or realized as a separate transmitter and receiver, as known by those with skill in the art. The communication interface 402 may be configured to be operable for communication according to one or more wireless-communication protocols, some examples of which include LMR, LTE, APCO P25, ETSI DMR, TETRA, Wi-Fi, Bluetooth, and the like. The communication interface 402 may also include one or more wired-communication interfaces (for communication according to, e.g., Ethernet, USB, and/or one or more other protocols.) The communication interface 402 may include any necessary hardware (e.g., chipsets, antennas, Ethernet interfaces, etc.), any necessary firmware, and any necessary software for conducting one or more forms of communication with one or more other entities as described herein.

The data storage 406 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 4, the data storage 406 contains program instructions 408 executable by the processor 412 for carrying out various functions described herein, and further is depicted as containing and operational data 410, which may include any one or more data values stored by and/or accessed by the computing device in carrying out one or more of the functions described herein.

The processor 412 may include one or more processors of any type deemed suitable by those of skill in the relevant art, some examples including a general-purpose microprocessor and a dedicated digital signal processor (DSP).

The user interface 414 may include one or more input devices (a.k.a. components and the like) and/or one or more output devices (a.k.a. components and the like.) With respect to input devices, the user interface 414 may include one or more touchscreens, buttons, switches, microphones, and the like. With respect to output devices, the user interface 414 may include one or more displays, speakers, light emitting diodes (LEDs), and the like. Moreover, one or more components (e.g., an interactive touchscreen and display) of the user interface 414 could provide both user-input and user-output functionality. Other user interface components could also be present, as known to those of skill in the art. In some embodiments, the computing device does not include a user interface. Some of the elements in previous figures that may be part of the user interface 414 include the user-interface button 208 and the user-interface-notification element 306.

The peripherals 416 may include any computing device accessory, component, or the like, that is accessible to and useable by the computing device during operation. Example peripherals 416 include a GPS receiver, an altimeter, an RSSI sensor, and the like. Some of the elements in previous figures that may be part of the peripherals 416 include the scanner 104, the RFID reader 106, the NFC reader 108, the suction and gripping apparatus 204, the proximity sensor 206, and the pressure sensors 304.

In an embodiment, the various component of the pressure-sensing glove 400 are all communicatively coupled with one another via a communication bus 418 (or other suitable communication network, or the like.)

Figure 5:
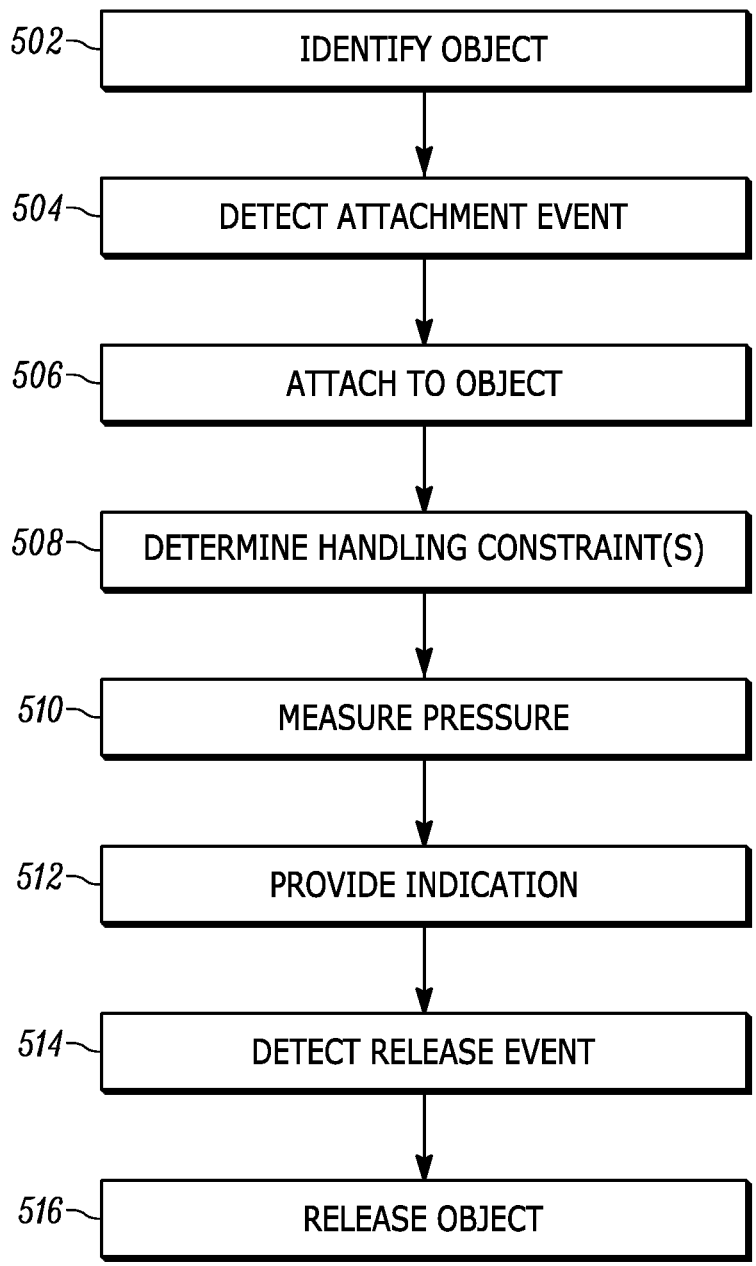
FIG. 5 depicts an example method, in accordance with some embodiments.

FIG. 5 depicts an example method, in accordance with some embodiments. In particular, FIG. 5 depicts a method 500 that is described by way of example as being carried out by a pressure-sensing glove such as the above-described pressure-sensing glove 100, 200, 300, or 400.

At step 502, the pressure-sensing glove identifies an object. This step may be performed in several different ways. In one embodiment, the pressure-sensing glove identifies the object by reading indicia using its scanner 104. The scanner 104 reads the information stored in the indicia and the pressure-sensing glove uses the received data to identify the object. This may involve querying a server with the received data. In other embodiments, the pressure-sensing glove may carry out step 502 by using the RFID reader 106, the NFC reader 108, and/or another type of data-acquisition device.

At step 504, the pressure-sensing glove detects an attachment event. This step may be performed in several different ways. In one embodiment, the pressure-sensing glove detects a manual triggering of the user-interface button 208. The user-interface button 208 may be manually triggered and responsively transmit a corresponding signal to a processor, controller, or the like of the pressure-sensing glove. In other embodiments, the pressure-sensing glove may carry out step 504 by detecting a signal from the proximity sensor 206. And certainly other example implementations are possible.

At step 506, the pressure-sensing glove attaches to the object that was identified at step 502. This step may be performed in several different ways. In one embodiment, the pressure-sensing glove attaches to the object by triggering the suction and gripping apparatus 204 to attach to the identified object. And certainly other example implementations are possible.

At step 508, the pressure-sensing glove determines one or more handling constraints associated with the identified object. This step may be performed in several different ways. In one embodiment, the pressure-sensing glove determines handling constraints by determining an acceptable pressure range for the object. The acceptable pressure range of the object may be determined by, as described below in connection with FIG. 6, sending to a remote server an identifier of the object, and receiving from the remote server at least one handling constraint, which again may include an acceptable pressure range associated with the object. The at least one handling constraint may also or instead include one or more other handling constraints, such as whether the object is fragile, brittle, liquid-filled, flammable, and/or the like.

At step 510, the pressure-sensing glove measures the pressure exerted on the identified object via the pressure-sensing glove. This step may be performed in several different ways. In one embodiment, the pressure-sensing glove measures the pressure exerted on the object by receiving measured pressure from the pressure sensors 304 on the pressure-sensing glove(s). And certainly other example implementations are possible.

At step 512, the pressure-sensing glove provides an indication, via a user interface, based on the measured pressure and the acceptable pressure range. This step may be performed in several different ways. The indication may be visible, audible, and/or tactile. The pressure-sensing glove may provide an indication that the measured pressure is above, within, or below the acceptable pressure range. The indication could include numerical measurements. The indication could be provided on a companion device such as a smartphone via a Bluetooth connection. And certainly other example implementations are possible.

At step 514, the pressure-sensing glove releases the object. This step may be performed in several different ways. In one embodiment, the pressure-sensing glove releases the object by triggering a release by the suction and gripping apparatus 204. The pressure-sensing glove may do this responsive to detecting that the user-interface button 208 has been actuated. The pressure-sensing glove may release the object responsive to receiving a signal from the proximity sensor 206, perhaps indicative of the proximity sensor being near a placement area for the object. And certainly other example implementations are possible.

Figure 6:
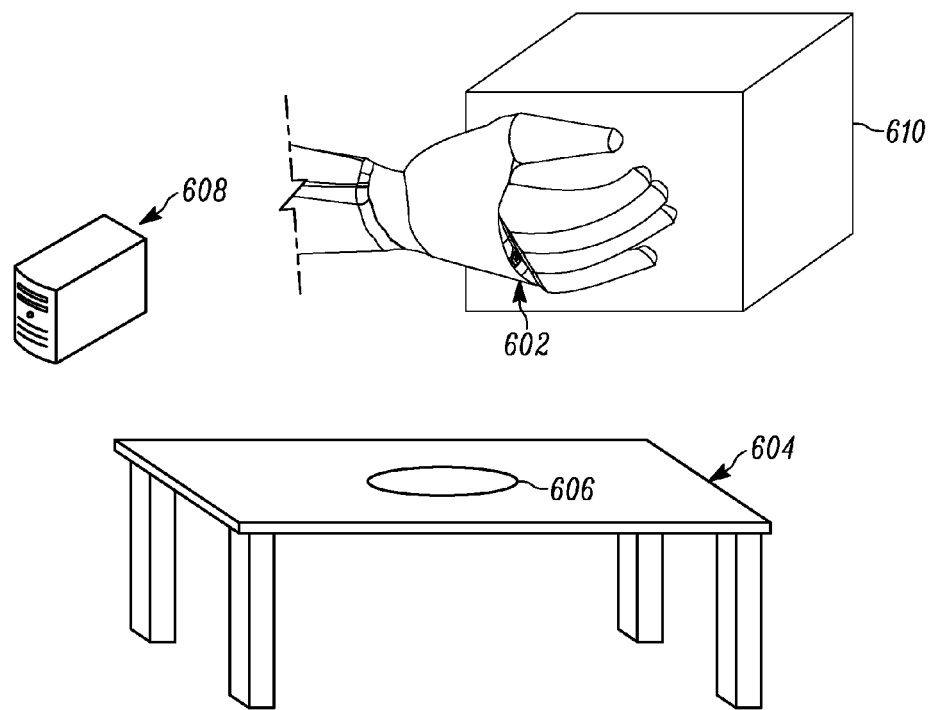
FIG. 6 depicts an example arrangement that includes a pressure-sensing glove, a server, and a placement area for an object, in accordance with some embodiments.

FIG. 6 depicts an example arrangement that includes a pressure-sensing glove, a server, and a placement area for an object, in accordance with some embodiments. In particular, FIG. 6 depicts a pressure-sensing glove 602, a placement area 604, a remote proximity sensor 606, a remote server 608, and an object 610. It is noted that the locations of these components that are displayed in the example of FIG. 6 are by way of example, and that other configurations could be used.

The remote proximity sensor 606 may be configured to work in a number of different ways, perhaps using infrared, sonar, detection of a nearby RFID tag, RF communication, and/or one or more other types of proximity-detecting technologies. The remote proximity sensor 606 may be responsive to the detection of proximity of a current object (e.g., the object 610), the pressure-sensing glove 602, and/or one or more other items. In an embodiment, the remote proximity sensor 606 detects that the object 610 is nearby, and responsively sends a signal to the pressure-sensing glove 602, which may responsively trigger a release event of the object 610.

The remote server 608 may be configured to work in a number of different ways, perhaps as a database server, a file server, a web server, an application server, and/or one or more other types of servers. The remote server may be further configured to communicate to a client via LAN, Wi-Fi, Bluetooth, NFC, and/or one or more other types of wired and/or wireless technologies.

Figure 7:
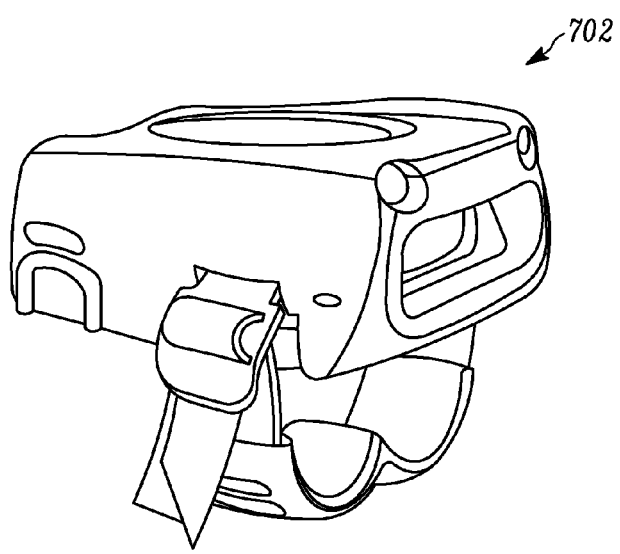
FIG. 7 depicts an example ring scanner that can be used in conjunction with a pressure-sensing glove, in accordance with some embodiments.

FIG. 7 depicts an example ring scanner that can be used in conjunction with a pressure-sensing glove, in accordance with some embodiments. The ring scanner 702 is an optional peripheral 416 to the pressure-sensing glove 400. If the pressure-sensing glove 400 does not include a scanner, the ring scanner 702 may be coupled with the pressure-sensing glove 400 to read indicia.

There are several other optional peripherals 416 to the pressure-sensing glove 400 including but not limited to, a headset scanner, a fixed scanner, and a scan engine, among several other possibilities.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A wearable accessory, comprising:
   a processor configured to:
      identify an object; and
      detect an attachment-triggering event;
   a suction and gripping device configured to, responsive to the attachment-triggering event, attach to the object, wherein attaching to the object comprises applying a suction pressure to the object;
   wherein the processor is configured to:
      determine at least one handling constraint associated with the object, wherein the at least one handling constraint comprises an acceptable pressure range;
      measure a pressure exerted on the object via the accessory;
      provide an indication, via a user interface, based on the measured pressure and the acceptable pressure range; and
      detect a release-triggering event, wherein the suction and gripping apparatus is configured to release the object in response to the release-triggering event.

2. The wearable accessory of claim 1, further comprising a scanner, wherein identifying the object comprises processing data from the scanner corresponding to a barcode associated with the object.

3. The wearable accessory of claim 1, further comprising a RFID reader, wherein identifying the object comprises processing data from the RFID reader corresponding to an RFID tag associated with the object.

4. The wearable accessory of claim 1, wherein the indication comprises a high-pressure indication if the measured pressure exceeds the acceptable pressure range.

5. The wearable accessory of claim 1, wherein the indication comprises a low-pressure indication if the measured pressure is below the acceptable pressure range.

6. The wearable accessory of claim 1, further comprising a user-interface element, wherein the processor is to, upon actuation of the user-interface element to:
   determine whether or not an object is currently identified and, if so, determine whether or not the accessory is attached to the currently identified object;
   initiate an object-scan function if no object is currently identified;
   initiate an object-attach function if an object is currently identified and the accessory is not currently attached to the currently identified object; and
   initiate an object-detach function if an object is currently identified and the accessory is currently attached to the currently identified object.

7. The wearable accessory of claim 6, wherein the user-interface element is a button.

8. The wearable accessory of claim 1, wherein determining the at least one handling constraint associated with the object comprises:
   sending, to a remote server, an identity of the object; and
   receiving, from the remote server, at least one handling constraint associated with the object.

9. The wearable accessory of claim 1, wherein the release-triggering event is actuation of a user-interface element.

10. The wearable accessory of claim 9, wherein the user-interface element is a button.

11. The wearable accessory of claim 1, wherein the release-triggering event comprises a proximity to a destination location.

12. The wearable accessory of claim 11, wherein the proximity is the proximity of the object.

13. The wearable accessory of claim 11, wherein the proximity is the proximity of the wearable accessory.

14. The wearable accessory of claim 1, further comprising a proximity sensor, wherein detecting the release-triggering event comprises detecting the release-triggering event via the proximity sensor.

15. The wearable accessory of claim 1, wherein detecting the release-triggering event comprises receiving a proximity indication from a proximity sensor remote to the wearable accessory.

16. A system comprising a wearable accessory, the wearable accessory comprising:
   an attachment mechanism configured to attach to an object;
   a pressure-sensor system configured to measure a pressure exerted on the object;
   a communication interface;
   a user interface; and
   a controller programmed to carry out a set of functions, wherein the set of functions comprises:
      receiving, via the communication interface, at least one handling constraint associated with the object, wherein the at least one handling constraint comprises an acceptable pressure range;
      detecting an attachment-triggering event, and responsively controlling the attachment mechanism to attach to the object;
      providing an indication, via the user interface, based on the measured pressure and the acceptable pressure range; and
      detecting a release-triggering event, and responsively controlling the attachment mechanism to detach from the object.

17. The system of claim 16, wherein:
   the wearable accessory is a first wearable accessory that is configured to be worn on a first hand of a user;

the system further comprises a second wearable accessory that is configured to be worn on a second hand of the user;

the pressure-sensor system comprises a first pressure-sensor system disposed on the first wearable accessory and a second pressure-sensor system disposed on the second wearable accessory; and measuring the pressure exerted on the object comprises (i) receiving a first and a second measured pressure from the first and second pressure-sensor systems, respectively, and (ii) determining the pressure exerted on the object based on the first and second measured pressures.

18. The system of claim 16, further comprising a ring scanner configured to:

scan an object identifier associated with the object; and send, to the communication interface, a representation of the scanned object identifier, wherein the at least one received handling constraint is associated with the representation of the scanned object identifier.

19. A method comprising:

identifying an object;

detecting, using a processor, an attachment-triggering event;

responsive to detecting the attachment-triggering event, attaching to the object by applying suction to the object;

determining, using the processor, at least one handling constraint associated with the object, wherein the at least one handling constraint comprises an acceptable pressure range;

measuring, using the processor, a pressure exerted on the object via the accessory;

providing an indication, via a user interface, based on the measured pressure and the acceptable pressure range; and detecting, using the processor, a release-triggering event, and responsively releasing the object.

20. A wearable accessory, wherein the accessory is configured to:

identify an object;

detect an attachment-triggering event;

responsive to detecting the attachment-triggering event, attach to the object;

determine at least one handling constraint associated with the object, wherein the at least one handling constraint comprises an acceptable pressure range;

measure a pressure exerted on the object via the accessory;

provide an indication, via a user interface, based on the measured pressure and the acceptable pressure range, wherein the indication comprises a high-pressure indication if the measured pressure exceeds the acceptable pressure range; and detect a release-triggering event, and responsively release the object.

21. A wearable accessory, wherein the accessory is configured to:

identify an object;

detect an attachment-triggering event;

responsive to detecting the attachment-triggering event, attach to the object;

determine at least one handling constraint associated with the object, wherein the at least one handling constraint comprises an acceptable pressure range;

measure a pressure exerted on the object via the accessory;

provide an indication, via a user interface, based on the measured pressure and the acceptable pressure range, wherein the indication comprises a low-pressure indication if the measured pressure is below the acceptable pressure range; and detect a release-triggering event, and responsively release the object.

22. A wearable accessory, wherein the accessory is configured to:

identify an object;

detect an attachment-triggering event;

responsive to detecting the attachment-triggering event, attach to the object;

determine at least one handling constraint associated with the object, wherein the at least one handling constraint comprises an acceptable pressure range;

measure a pressure exerted on the object via the accessory;

provide an indication, via a user interface, based on the measured pressure and the acceptable pressure range;

detect a release-triggering event, and responsively release the object;

the wearable accessory including a user-interface element, wherein the wearable accessory is configured upon actuation of the user-interface element to responsively:

determine whether an object is currently identified and, if so, determine whether the accessory is attached to the currently identified object;

initiate an object-scan function if no object is currently identified;

initiate an object-attach function if an object is currently identified and the accessory is not currently attached to the currently identified object; and initiate an object-detach function if an object is currently identified and the accessory is currently attached to the currently identified object.

23. A wearable accessory, wherein the accessory is configured to:

identify an object;

detect an attachment-triggering event;

responsive to detecting the attachment-triggering event, attach to the object;

determine at least one handling constraint associated with the object, wherein the at least one handling constraint comprises an acceptable pressure range, and determining the at least one handling constraint associated with the object comprises:

sending, to a remote server, an identity of the object; and receiving, from the remote server, at least one handling constraint associated with the object;

measure a pressure exerted on the object via the accessory;

provide an indication, via a user interface, based on the measured pressure and the acceptable pressure range; and detect a release-triggering event, and responsively release the object.

* * * * *